United States Patent [19]

Livermore et al.

[11] 4,217,480

[45] Aug. 12, 1980

[54] THERMAL PRINT BAR

[75] Inventors: Frederick C. Livermore, Kanata; Robert J. Boynton, Ottawa, both of Canada

[73] Assignee: Northern Telecom Limited, Montreal, Canada

[21] Appl. No.: 939,352

[22] Filed: Sep. 5, 1978

[51] Int. Cl.$^2$ .............................. H05B 1/00
[52] U.S. Cl. .................................. 219/216; 219/543
[58] Field of Search ............... 219/216, 543; 338/308, 338/309, 9; 346/76 PH; 427/96; 29/611

[56] References Cited

U.S. PATENT DOCUMENTS

| | | | |
|---|---|---|---|
| 3,393,390 | 7/1968 | Louis | 338/9 |
| 3,411,947 | 11/1968 | Block et al. | 338/309 X |
| 4,055,743 | 10/1977 | Conta et al. | 219/216 |
| 4,063,211 | 12/1977 | Yasujima et al. | 338/308 |
| 4,099,046 | 7/1978 | Boynton et al. | 219/216 |
| 4,104,607 | 8/1978 | Jones | 338/9 X |

Primary Examiner—C. L. Albritton
Attorney, Agent, or Firm—Sidney T. Jelly

[57] ABSTRACT

In a thermal print bar for use in facsimile systems, an array of individually selectable electrical current paths are defined in a strip of resistive materials having a high negative temperature coefficient of resistance. In operation, the resistance of a selected current path is markedly reduced in contrast with the resistance of unselected current paths parallel to the selected path so that the parallel current paths do not experience joule heating. Electrical power saving and visual contrast result.

4 Claims, 1 Drawing Figure

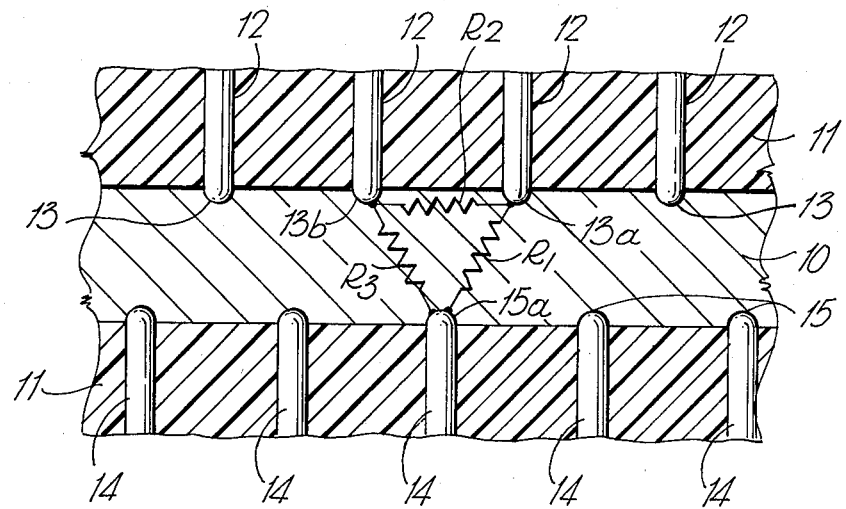

THERMAL PRINT BAR

This invention relates to thermal print bars for use, for example, in facsimile systems.

In a known type of facsimile system a thermal print bar is moved relative to a receptor of heat sensitive paper. A surface of the print bar is caused to undergo localized heating in response to an incoming facsimile signal so an array of pels, or darkened areas, appearing on the heat sensitive paper accurately resemble pictorial or other information contained in the facsimile signal.

A previously proposed form of thermal print bar has a strip of thick film resistive material printed on a substrate. Thick film conductors connect contact areas along both edges of the strip to drive circuitry which, when energized, passes current across the strip between preselected pairs of contact areas to produce localized heating effects at each current path. A problem with known thermal print bars stems from the need to site conductors and their associated contact areas very close together to achieve high resolution. Typically the centre-to-centre spacing of contact areas is 0.01". Depending on the pattern of contact areas in the resistive material, many parallel current paths may be set up between the contact areas of a selected pair and adjacent contact areas which have not been so selected.

This has two undesirable effects: firstly, more power is required to heat the resistive material in the selected current path to compensate for power dissipated in adjacent parts of the resistive strip. This makes necessary higher power handling drive electronics with a commensurate cost increase. Secondly, peripheral heating adjacent the selected current path may lead to undesirable spreading of the pels; the resulting facsimile on the heat sensitive paper may then become correspondingly indistinct. Laser machining of the thick film resistive material into individual elements with a density of about 200 elements per inch or connecting external diodes are two methods used to reduce this leakage current. However both methods are expensive because of the extra manufacturing process steps required.

According to the invention there is provided a thermal print bar for use with a thermally sensitive receptor sheet, said bar comprising a strip of resistive material deposited on a substrate material, a plurality of conductors deposited on the substrate material and connecting contact areas along both edges of the strip to terminals, characterized in that the resistive material has in an operating zone a negative temperature coefficient of resistance greater than 1000 parts per million per degree centigrade.

In use, a current path is established between a selected pair of contact areas which produces a heating effect which, in turn, reduces the resistance of the current path. Parallel current paths existing between said selected pair of contact areas via non-selected contact areas are, by virtue of the enhanced conductivity of the current path between the selected pair of contact areas, rendered of insufficient magnitude to produce a heating effect materially altering conductivity.

In a preferred arrangement contact areas are regularly spaced along both edges of the strip, the contact areas along one edge being staggered with respect to the contact areas along the other edge. In such a staggered arrangement, a selected pair of contact areas might be any one contact area along one side edge and either one of the two closest contact areas on the other edge of the strip.

In a practical arrangement of the invention, drive circuitry initiates current between the contact areas of selected pairs of contact areas, selection and timing circuitry being controlled by an incoming signal.

An embodiment of the invention will now be described by way of example with reference to the accompanying drawing which shows a part of a thermal print bar with schematically indicated current paths.

Referring to the drawing in detail, there is shown a part of an electrically resistive strip or bar 10 positioned on a substrate 11 of electrically insulating material. A first series or pattern 12 of conductors have contact areas 13 along one edge of the strip and a second series or pattern 14 of conductors has contact areas 15 along the other edge of the strip 10. The contact areas along each strip edge are regularly spaced, the areas 13 being staggered with respect to the areas 15. On applying a potential difference between a pair of contact areas, for example, the contact areas 13a and 15a, one each edge of the strip, current flowing across the uniformly resistive strip follows a direct path and produces localized heating of the strip at the current path. Only certain contact area pairs are selected to produce a heating effect. Thus the contact area 15a can make a pair with either of the two contact areas 13a and 13b which are located on the other edge of the strip and displaced longitudinally with respect to it.

The resistive strip 10 comprises a thick film material having a marked negative temperature coefficient of resistance of 5000 parts per million per degree centigrade. Typically a temperature increase of about 300° C. is required in order to activate the heat sensitive paper. Thus when subjected to such a temperature increase, the resistance of elements fabricated in the thick film strip 10 decreases by:

$$\frac{5000 \times 300 \times 100}{1,000,000} \% = 150\% \text{ reduction in resistance.}$$

If a constant voltage source is utilized, the power $P = V^2/R$ dissipated in an element increases as the temperature of the element increases until an equilibrium position is attained.

One example of a suitable thick film material useful in this application is FIRON made by E.M.C.A. under the specification TM-103.

The substrate is of suitable electrically insulated material, for example glass, quartz or ceramic. The conductors comprise a three-part layer of conducting material, for example, titanium, palladium, gold. The techniques for manufacturing the thermal printing bar described are well-known in electronics production art, and will not be described in detail here.

It will be understood that drive circuitry is required in order to apply potential differences to selected pairs of the contact areas and timing and addressing circuitry is required to ensure that an input facsimile signal is accurately reproduced on movement of the thermal print bar relative to a receptor sheet of heat sensitive paper.

As shown in the figure, in addition to the direct current path linking a selected pair of contact areas, for example, the path of resistance $R_1$ linking contact areas 13a and 15a, additional parallel currents are initiated by applying a potential difference between contact areas 13a and 15a, the path of one such current being represented by the resistances $R_2$ and $R_3$ which respectively link contact areas 13a and 13b and the contact areas 13b and 15a.

The benefit of using a thick film material having a high negative temperature coefficient of resistance is that the ratio $(R_2+R_3)/R_1$ increases rapidly consequent upon the reduction in the resistance of $R_1$ by virtue of the temperature increases in $R_1$. The power dissipated in resistance of $R_2$ and $R_3$ is therefore made relatively insignificant. The heating at the current path is therefore more localized which ensures a greater resolution between printed elements. In addition, the power ($V^2/R$) dissipated in all of the parallel current paths is markedly reduced thereby permitting use of drive circuitry with lower power handling components.

It may be determined that if the thick film resistive material used has an insignificant temperature coefficient of resistance, for example ±100 parts per million per degree centigrade which has hitherto been used, then a 300° C. increase in temperature produces only a 3% change in resistance and the ratio $(R_2+R_3)/R_1$ stays practicably stable as the temperature of $R_1$ increases.

Although having an immediate applicability to facsimile systems, the invention could find a use on many structures where, in operation, a heat pattern is required, especially where the geometry of conductors to the resistive strip is complex and laser scribing of the strip unacceptable. Although a thick film material is preferred in the invention, thin film materials are available with the property of a high negative temperature coefficient of resistance and could be used in the manner described.

What is claimed is:

1. A thermal print bar comprising an elongate strip of resistive material deposited on a substrate material, said strip having a pair of edges, a plurality of conductors deposited on the substrate material and connecting contact areas along both edges of the resistive materials to terminals, wherein the resistive material has, in an operating regime, a negative temperature coefficient of resistance greater than 1000 parts per million per degree centigrade.

2. A thermal print bar as claimed in claim 1, wherein the contact areas along each edge of the strip are regularly spaced from one another, the regularly spaced contact areas along one of the edges being staggered with respect to the regularly spaced contact areas along the other edge.

3. A thermal print bar as claimed in claim 1 or 2 wherein the resistive material is screen-printed as a thick film.

4. A thermal print bar comprising:
   a region of resistive material deposited on a substrate;
   a plurality of conductors deposited on the substrate, each of the conductors having a contact area with the resistive material; and
   means for applying a potential difference across the resistive material between contact areas of selected pairs thereof to cause Joule effect heating of the resistive material between the selected contact areas;
   wherein the resistive material has a negative temperature coefficient of resistance sufficiently high that on application of said potential difference Joule effect heating of the resistive material and consequent increased electrical current between the contact areas of each selected pair of conductors reinforce one another and become progressively localized in a zone extending directly between such contact areas.

* * * * *